(12) United States Patent
Tanibata

(10) Patent No.: US 12,019,940 B2
(45) Date of Patent: Jun. 25, 2024

(54) DISPLAY CONTROL DEVICE AND DISPLAY CONTROL METHOD

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 17/531,323

(22) Filed: Nov. 19, 2021

(65) Prior Publication Data

US 2022/0075590 A1 Mar. 10, 2022

Related U.S. Application Data

(63) Continuation of application No. PCT/JP2020/008701, filed on Mar. 2, 2020.

(30) Foreign Application Priority Data

May 23, 2019 (JP) ................................. 2019-097077

(51) Int. Cl.
*B60K 35/60* (2024.01)
*G06F 3/14* (2006.01)
*G09G 5/38* (2006.01)

(52) U.S. Cl.
CPC ............ *G06F 3/1446* (2013.01); *B60K 35/60* (2024.01); *G09G 5/38* (2013.01)

(58) Field of Classification Search
None
See application file for complete search history.

(56) References Cited

U.S. PATENT DOCUMENTS

| | | | |
|---|---|---|---|
| 2002/0015035 A1 | 2/2002 | Inaba et al. | |
| 2012/0243017 A1 | 9/2012 | Machida | |
| 2013/0030689 A1 | 1/2013 | Yamaguchi | |
| 2017/0262339 A1 | 9/2017 | Hoshina | |
| 2019/0222700 A1* | 7/2019 | Tsukada | H04N 1/0044 |
| 2019/0333480 A1* | 10/2019 | Lang | G06F 3/011 |
| 2020/0349905 A1* | 11/2020 | Hicks | G06F 3/013 |

FOREIGN PATENT DOCUMENTS

| | | |
|---|---|---|
| JP | 2002-046502 A | 2/2002 |
| JP | 2010044459 A | 2/2010 |
| JP | 2013-030931 A | 2/2013 |
| JP | 2017-161760 A | 9/2017 |

* cited by examiner

*Primary Examiner* — Eileen M Adams
(74) *Attorney, Agent, or Firm* — Harness, Dickey & Pierce, P.L.C.

(57) ABSTRACT

A display control device, which controls images to be displayed on a single display mounted on a vehicle, includes: multiple image determination units that determine the images to be displayed on the display; a state monitoring unit that successively monitors, as monitoring targets, the plurality of image determination units to determine whether an abnormality occurs in the plurality of image determination units; and a display mode determination unit that switches a display mode of the display in response to the state monitoring unit determining that an error image is displayed on the display due to the abnormality occurred in the plurality of image determination units. The display mode determination unit switches the display mode such that the error image is less likely to give discomfort to a user.

9 Claims, 8 Drawing Sheets

AFTER REARRANGEMENT

NORMAL STATE

ERROR IMAGE IN DISPLAY

AFTER REARRANGEMENT

DISPLAY CONTROL DEVICE AND DISPLAY CONTROL METHOD

CROSS REFERENCE TO RELATED APPLICATIONS

The present application is a continuation application of International Patent Application No. PCT/JP2020/008701 filed on Mar. 2, 2020, which designated the U.S. and claims the benefit of priority from Japanese Patent Application No. 2019-097077 filed on May 23, 2019. The entire disclosures of all of the above applications are incorporated herein by reference.

TECHNICAL FIELD

The present disclosure relates to a display control device and a display control method each of which performs a display control when an abnormality occurs in an application.

BACKGROUND

There has been known a system that displays, on one display mounted on a vehicle, an image instructed by a navigation device mounted on the vehicle and an image instructed by a smartphone brought into the vehicle by a user.

SUMMARY

The present disclosure provides a display control device, which controls images to be displayed on a single display mounted on a vehicle. The display control device includes: multiple image determination units that determine the images to be displayed on the display; a state monitoring unit that successively monitors, as monitoring targets, the plurality of image determination units to determine whether an abnormality occurs in the plurality of image determination units; and a display mode determination unit that switches a display mode of the display in response to the state monitoring unit determining that an error image is displayed on the display due to the abnormality occurred in the plurality of image determination units. The display mode determination unit switches the display mode such that the error image is less likely to give discomfort to a user.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
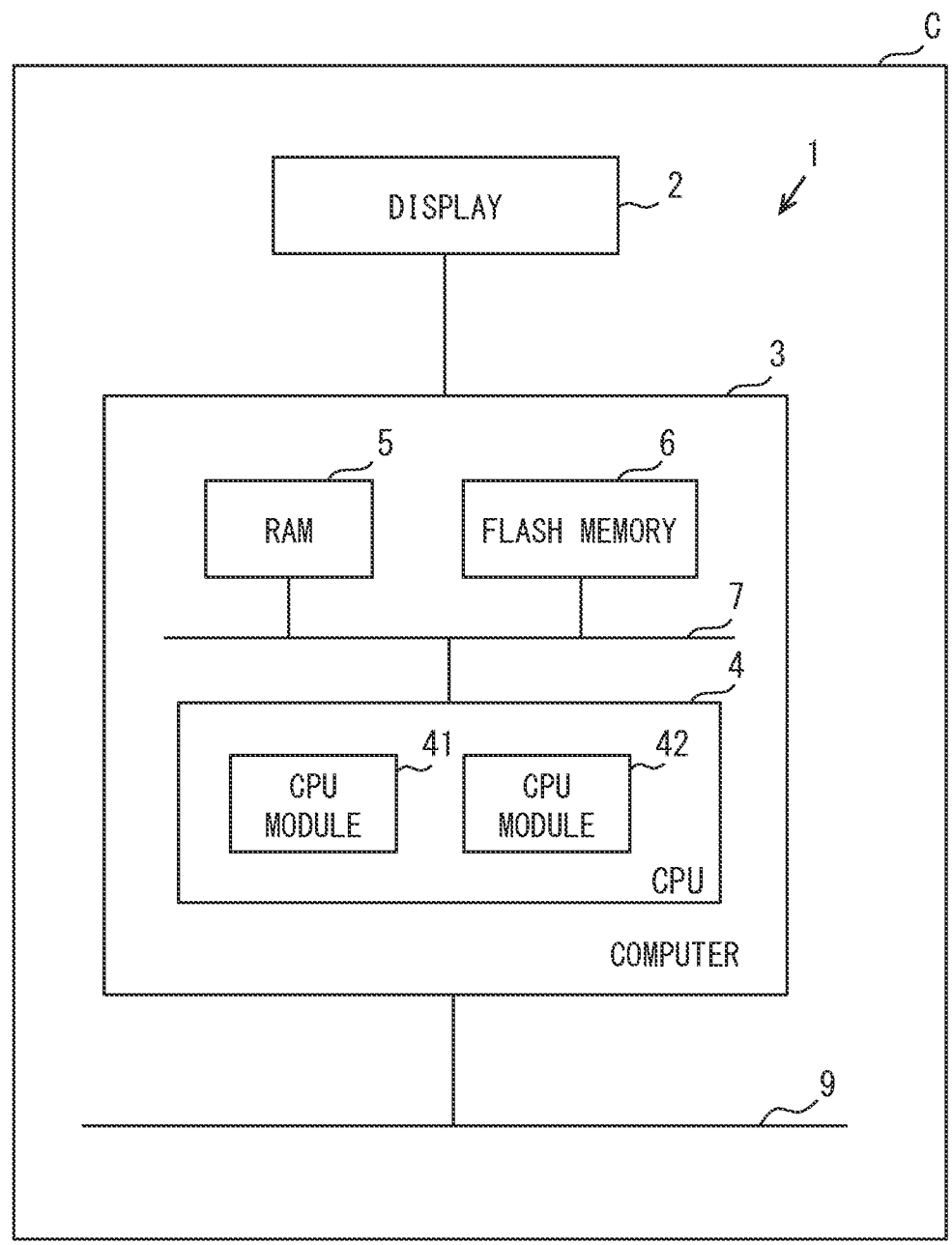
FIG. 1 is a diagram showing an overall configuration of a display system.

Before describing embodiments of the present disclosure, a known system will be described. In a known system, on one display mounted on a vehicle, an image instructed by a navigation device mounted on the vehicle and an image instructed by a smartphone brought into the vehicle by a user are displayed together. In this kind of system, the setting information of the system is automatically reset when the application program (hereinafter referred to as application) is restarted.

The application provided by the navigation device is a separate application from the application provided by the smartphone. When the display system supports multiple applications, an image instructed by a corresponding application may be displayed in a damaged state due to an abnormality or error occurred in the corresponding application. The image displayed by the abnormal application, that is, an error image or a damaged image may give uncomfortable feeling to the user.

According to an aspect of the present disclosure, a display control device, which controls images to be displayed on a single display mounted on a vehicle, includes multiple image determination units that determine the images to be displayed on the display; a state monitoring unit that successively monitors, as monitoring targets, the plurality of image determination units to determine whether an abnormality occurs in the plurality of image determination units; and a display mode determination unit that switches a display mode of the display in response to the state monitoring unit determining that an error image is displayed on the display due to the abnormality occurred in the plurality of image determination units. Specifically, the display mode determination unit switches the display mode (i) by erasing the error image and rearranging the remaining images on the display, (ii) by graying out the error image, or (iii) by displaying, instead of the error image, a message indicating an occurrence of the abnormality.

In the above display control device, the state monitoring unit successively monitors whether the image determination units are normal as monitoring targets. The display mode determination unit switches the display mode of the display in response to the state monitoring unit determining that an error image is displayed on the display due to the abnormality occurred in the image determination units. The display mode determination unit switches the display mode such that the error image is less likely to give discomfort to a user. In this configuration, since the image determination unit is monitored by the state monitoring unit, when the image determined by the image determination unit changes to the error image, the display mode can be switched such that the error image is less likely to give discomfort to a user.

According to another aspect of the present disclosure, a display control method, which controls images to be displayed on a single display mounted on a vehicle, includes: determining a plurality of images to be displayed on the display as an image determination process; monitoring the image determination process as a monitoring target and determining whether an abnormality occurs in the image determination process; and switching a display mode of the display in response to determining that the abnormality is occurred in the image determination process and an error image is displayed on the display, the display mode being switched such that the error image is less likely to give discomfort to a user. Specifically, the display mode is switched (i) by erasing the error image and rearranging the remaining images on the display, (ii) by graying out the error image, or (iii) by displaying, instead of the error image, a message indicating an occurrence of the abnormality.

The following will describe an embodiment of the present disclosure with reference to the drawings. A display system 1 shown in FIG. 1 is mounted on a vehicle C. The display system 1 includes a display 2 and a computer 3, and the computer corresponds to a display control device. The display 2 is arranged at a position that can be visually recognized by an occupant in a passenger compartment of the vehicle C. The display 2 can display various images. As the display 2, a liquid crystal display or an organic EL display can be used.

The computer 3 is connected to the display 2, and is also connected to an in-vehicle LAN bus 9. The computer 3 is configured to transmit and receive signals to and from various devices mounted on the vehicle C via the in-vehicle LAN bus 9. For example, the signals received by the computer 3 via the in-vehicle LAN bus 9 include signals that indicate current states of the vehicle instruments as an image to be displayed on the display 2. The signals may include a signal indicating a vehicle speed, a signal indicating a remaining fuel amount, and the like.

(Computer Configuration)

As shown in FIG. 1, the computer 3 includes a CPU 4, a RAM 5, a flash memory 6, a bus line 7, and the like. The CPU 4 is provided by a processor. The CPU 4 in the present embodiment includes two CPU modules 41 and 42. Each CPU module 41, 42 includes one or more cores. Each CPU module 41, 42 can operate independently from one another.

The RAM 5 temporarily stores information or the like read out from the flash memory 6. The flash memory 6 is a non-volatile memory and stores various software programs 10 to be executed by the CPU 4.

Figure 2:
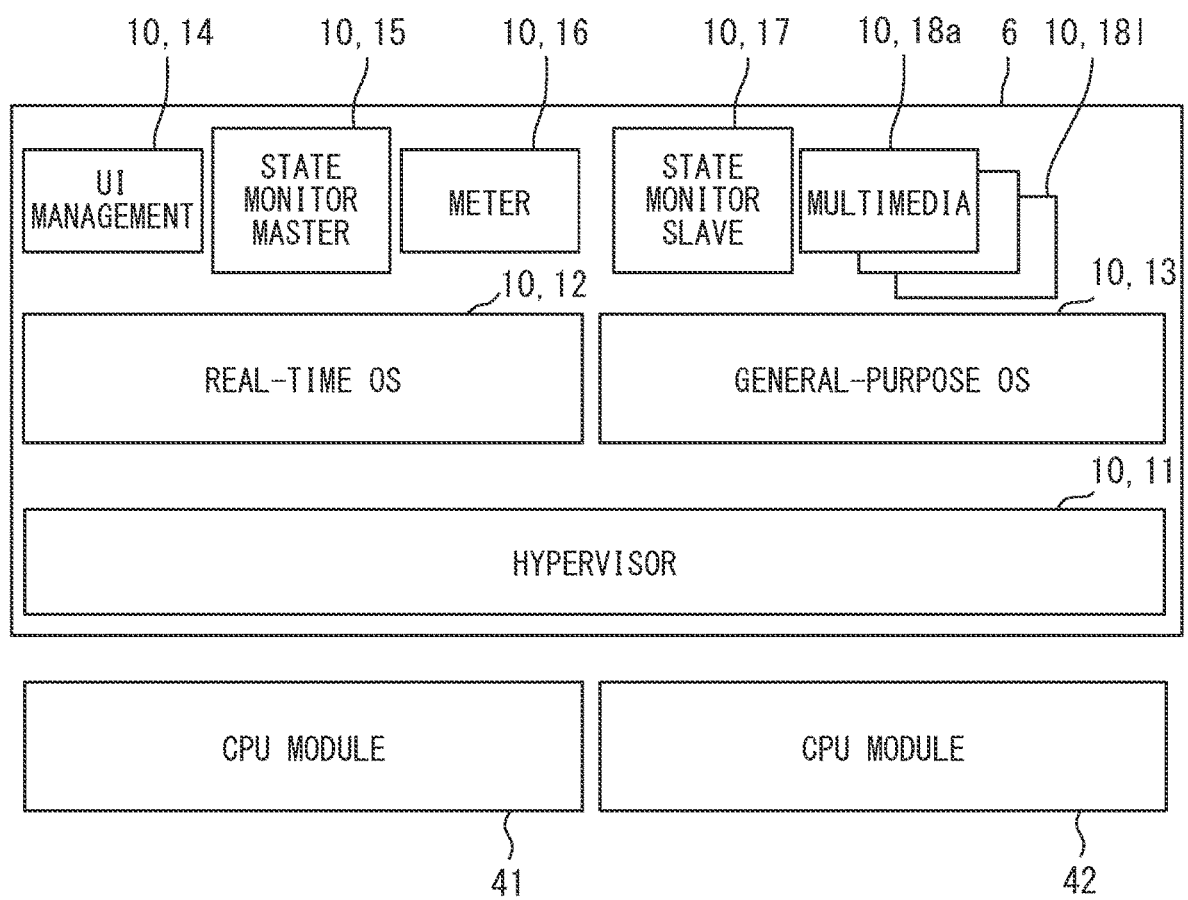
FIG. 2 is a diagram showing software stored in a flash memory.

FIG. 2 shows the software programs 10 stored in the flash memory 6. Each software program 10 is executed by the computer 3. FIG. 2 also shows which CPU module 41, 42 executes which software program 10. The various software programs shown in FIG. 2 may be stored in a non-volatile storage medium other than the flash memory 6 in a configuration where the computer 3 is provided with another non-volatile storage medium.

As shown in FIG. 2, the flash memory 6 stores a hypervisor 11, a real-time operating system (hereinafter referred to as real-time OS) 12, and a general-purpose operating system (hereinafter referred to as general-purpose OS) 13. In addition, various application software programs (hereinafter referred to as applications) are also stored in the flash memory 6. Specifically, the flash memory 6 stores, as applications, a user interface management application (hereinafter referred to as UI management application) 14, a state monitoring master application 15, a meter application 16, a state monitoring slave application 17, and multimedia applications 18a to 18l. When the multimedia applications 18a to 18l are not distinguished, it is collectively described as the multimedia applications 18.

The hypervisor 11 is a software program that creates a virtual environment on the computer 3. Specifically, the hypervisor 11 creates an environment in which two operating systems including the real-time OS 12 and the general-purpose OS 13 can operate on a single computer 3.

The real-time OS 12 is an operating system that performs real-time processing. The real-time OS 12 has an excellent stability. That is, the real-time OS 12 is a high stable operating system that is more stable than the general-purpose OS 13. The real-time OS 12 is executed by the CPU module 41.

The general-purpose OS 13 is an OS capable of executing more complicated functions than the real-time OS 12. However, the general-purpose OS 13 is inferior in stability to the real-time OS 12. That is, the general-purpose OS 13 is a low stable operating system. The general-purpose OS 13 is executed by the CPU module 42.

The UI management application 14, the state monitoring master application 15, and the meter application 16 run on the real-time OS 12. The state monitoring slave application 17 and the multimedia applications 18a to 18l run on the general-purpose OS 13. The number of multimedia applications 18 is not particularly limited. The number of multimedia applications 18 may be one, or may be multiple other than the number shown in the related drawing.

Figure 3:
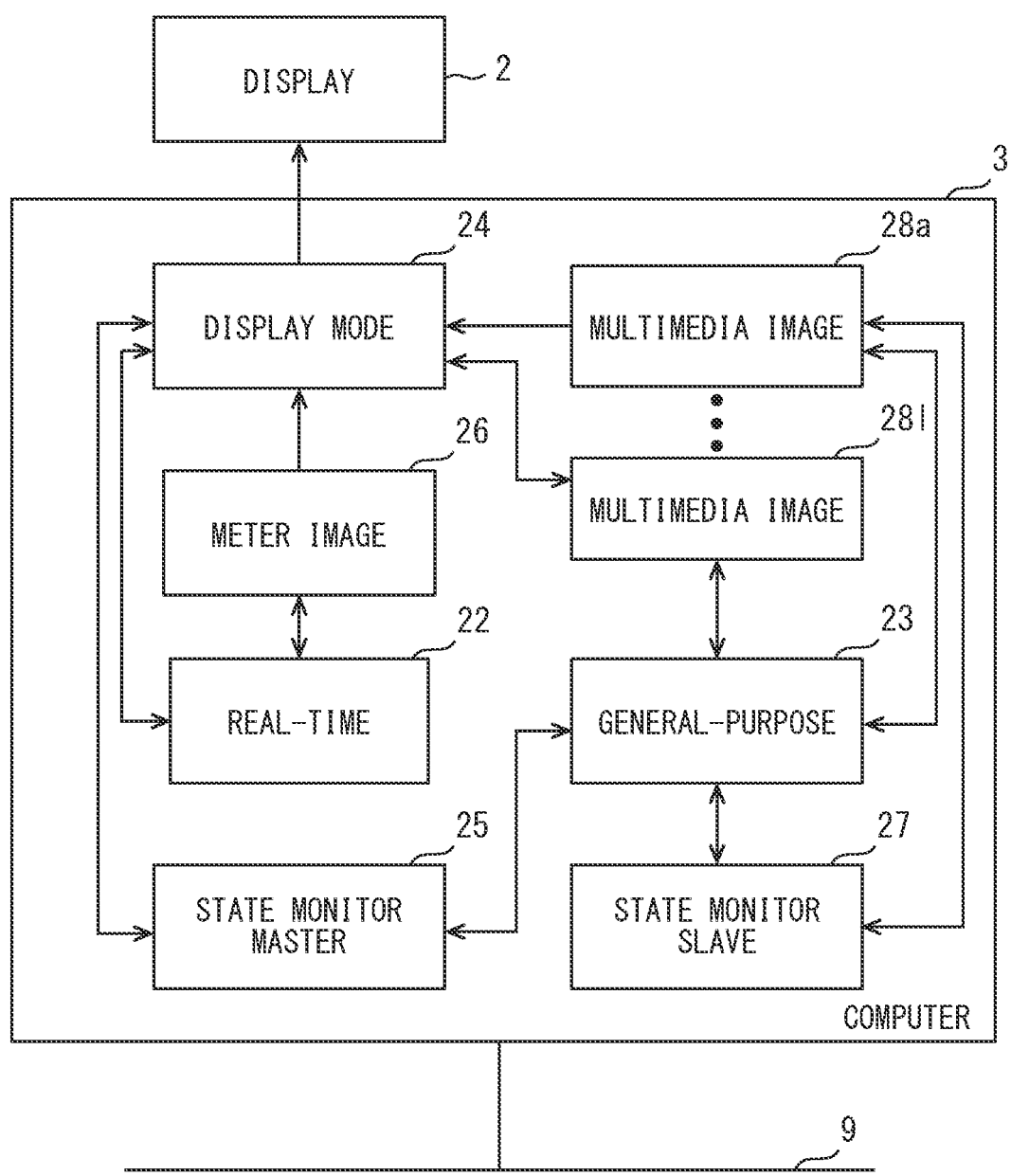
FIG. 3 is a diagram showing functions executed by a computer shown in FIG. 1.

When the computer 3 executes the applications, the computer 3 functions as each functional block shown in FIG. 3. Execution of the functional blocks correspond to an execution of a method implemented by execution of the program. The method corresponding to the program includes a display control method.

The computer 3 executes the real-time OS 12 to implement functions of a real-time basic control unit 22. The real-time basic control unit 22 controls the UI management application 14, the state monitoring master application 15, and the meter application 16 to function normally by executing functional programs. The computer 3 executes the general-purpose OS 13 to implement functions of a general-purpose basic control unit 23. The general-purpose basic control unit 23 controls the state monitoring slave application 17 and the multimedia application 18 to function normally by executing functional programs. For example, the real-time basic control unit 22 and the general-purpose basic control unit 23 perform process management for determining a priority for each process, API provision, memory management including memory allocation and memory release, and the like.

The computer 3 executes the state monitoring master application 15 to implement a state monitoring master 25. The state monitoring master 25 corresponds to a state monitoring unit. The state monitoring master application 15 corresponds to a state monitoring application. The state monitoring master 25 successively monitors whether the general-purpose basic control unit 23 is operating normally. For example, the monitoring frequency is set to a predetermined cycle.

The state monitoring master 25 monitors, in response to a notification from a state monitoring slave 27, whether the multimedia image determination units 28 are operating normally. That is, the multimedia image determination units 28 correspond to monitoring targets that are monitored by the state monitoring master 25. The state monitoring master 25 determines that the general-purpose OS 13 is not operating normally in response to the general-purpose OS 13 forcibly terminating an operation and then the general-purpose OS 13 restarting the operation. In response to determining that the general-purpose OS 13 is not operating normally, the state monitoring master 25 also determines that the applications running on the general-purpose OS 13 are not operating normally.

When the state monitoring master 25 determines that one multimedia image determination unit 28, that is, the monitoring target is abnormal, the state monitoring master 25 also determines that the images drawn by the abnormal multimedia image determination unit 28 and to be displayed on the display 2 may highly become error images caused by the abnormality in the corresponding multimedia image determination unit 28. In response to the state monitoring master 25 determining that the multimedia image determination unit 28 is abnormal, the state monitoring master 25 notifies a display mode determination unit 24 of the determination indicating that the multimedia image determination unit 28 is abnormal.

The error image is an image that is different from an image to be displayed in the normal state. The error image does not include an image preliminarily prepared to inform the user of an occurrence of an error. For example, the error image is an image in which image drawing is stopped in the middle of drawing. In the normal state, suppose that an image changes over time at a predetermined update speed. When the update speed is slow, and an image that is the same as the image in the normal state but is displayed at a different time point from the normal state also corresponds to an error image.

The computer 3 executes the meter application 16 to implement a meter image determination unit 26. The meter image determination unit 26 corresponds to an image determination unit, and executes an image determination process for determining an image of vehicle instruments to be displayed on the display 2 (hereinafter the image of vehicle instruments is also referred to as a meter image 30). Then, image data for drawing the determined image is generated, and the image data is provided to the display mode determination unit 24. Since the meter application 16 is a high stable image determination application that operates on the real-time OS 12, and the meter image determination unit 26 corresponds to a high stable image determination unit.

The computer 3 executes the state monitoring slave application 17 to implement a state monitoring slave 27. The state monitoring slave 27 periodically monitors whether each multimedia image determination unit 28 is operating normally. Then, the state monitoring slave 27 periodically notifies the state monitoring master 25 of the monitoring result of each multimedia image determination unit 28.

When one multimedia application 18 is in a forcible terminating state and/or in a restarting state, the state monitoring slave 27 determines that the multimedia image determination unit 28 corresponding to the multimedia application 18 is not operating normally.

The state monitoring slave 27 also determines that one multimedia image determination unit 28 is not operating normally in a case where the multimedia image determination unit 28 does not respond to a watchdog. The state monitoring slave 27 also determines that one multimedia image determination unit 28 is not operating normally in a case where the image determination frequency of the corresponding multimedia image determination unit 28 decreases to a level below a threshold value.

In a normal state, each multimedia image determination unit 28 updates the image to be displayed on the display 2 at regular intervals. Each time the image is updated, the state monitoring slave 27 is notified of the image update. Therefore, the state monitoring slave 27 determines whether the image determination frequency of each multimedia image determination unit 28 is equal to or less than the threshold value based on the notification interval.

The computer 3 executes the multimedia applications 18a to 18l to implement multimedia image determination units 28a to 28l, respectively. Each multimedia image determination unit 28 corresponds to an image determination unit, and executes an image determination process for determining a multimedia image to be displayed on the display 2. Then, image data for drawing the determined image is generated, and the image data is provided to the display mode determination unit 24.

For example, the multimedia application 18 may be a route guidance application, an audio playback application, a video playback application, a weather forecast application, and the like. Each multimedia image determination unit 28 is related to the corresponding multimedia application 18. Thus, the multimedia image determination units draw a route guidance image, an audio playback image, a video playback image, a weather forecast image, and the like. Each multimedia image determination unit 28 draws an icon image 31 (see FIG. 4) representing each function. Since the multimedia applications 18 operate on the general-purpose OS 13, each multimedia application 18 corresponds to a low stable image determination application, and the multimedia image determination unit 28 corresponds to a low stable image determination unit.

The computer 3 executes the UI management application 14 to implement the display mode determination unit 24. The computer 3 executes the UI management application 14 to implement the function of managing the user interface. The display 2 also corresponds to a user interface. Therefore, the computer 3 implements the display mode determination unit 24 by executing the UI management application 14. The UI management application 14 corresponds to a display mode determination application.

The display mode determination unit 24 successively acquires image data to be displayed on the display 2 from the image determination units 26 and 28. Then, the display mode determination unit 24 determines, on the display 2, a position of the image generated based on the acquired image data, and displays the image at the determined position.

When the state monitoring master 25 notifies, to the display mode determination unit 24, that the image drawn by one multimedia image determination unit 28 is an error image, the display mode determination unit 24 changes a display mode of the image on the display 2 so that a user is less likely feel discomfort caused by the error image.

Figure 4:
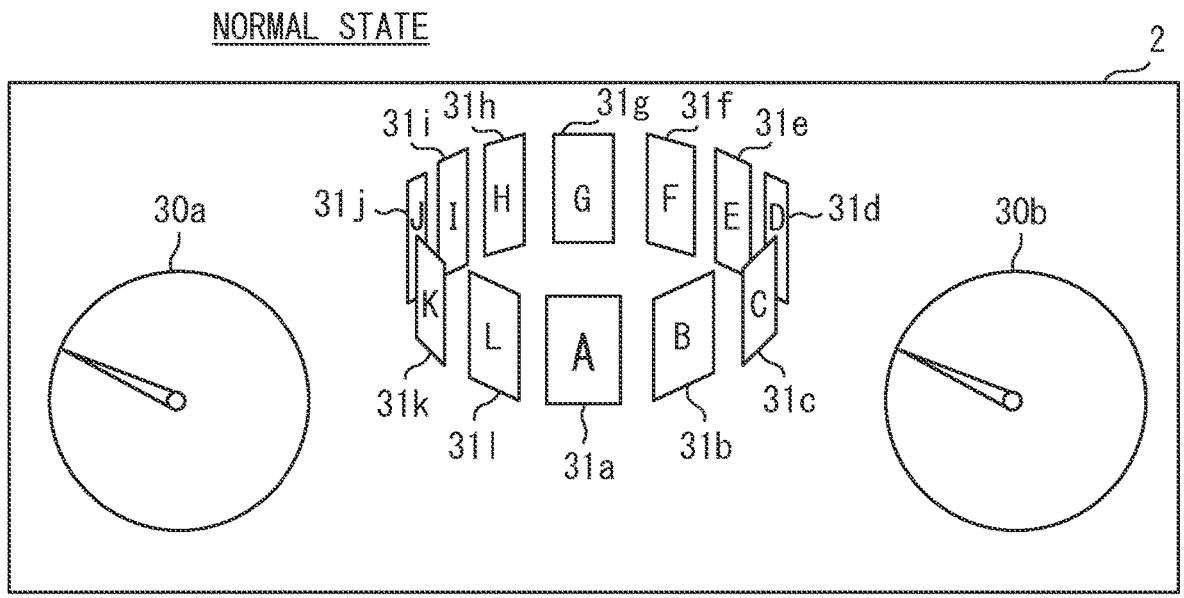
FIG. 4 is a display example on a display device in a normal state.
Figure 5:
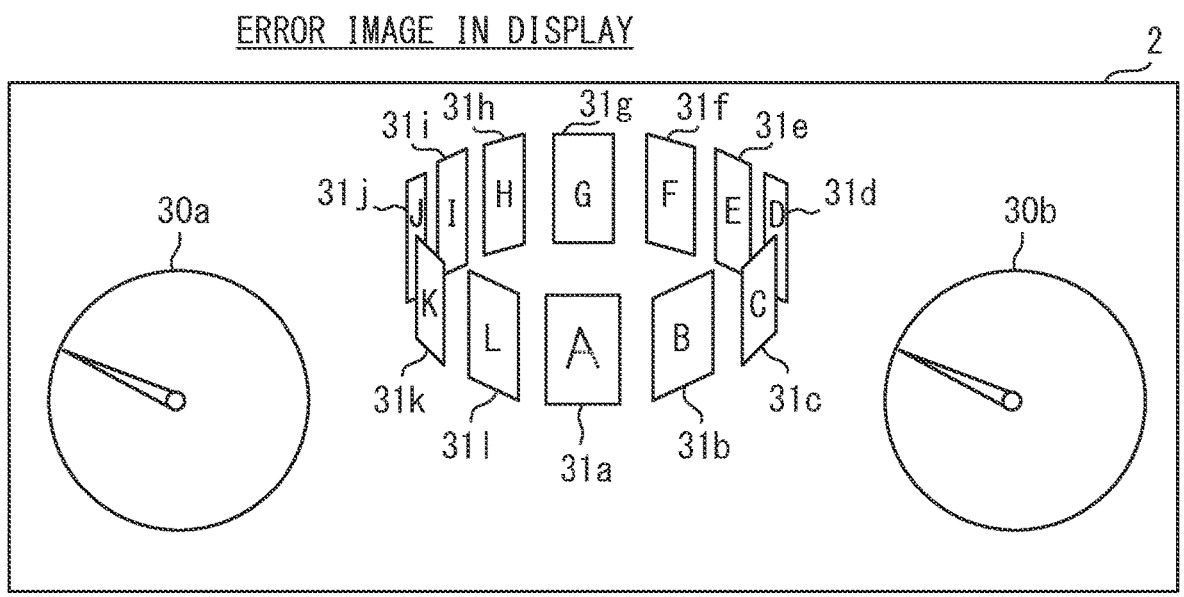
FIG. 5 is a display example on a display device in a case where an icon image is an error image.
Figure 6:
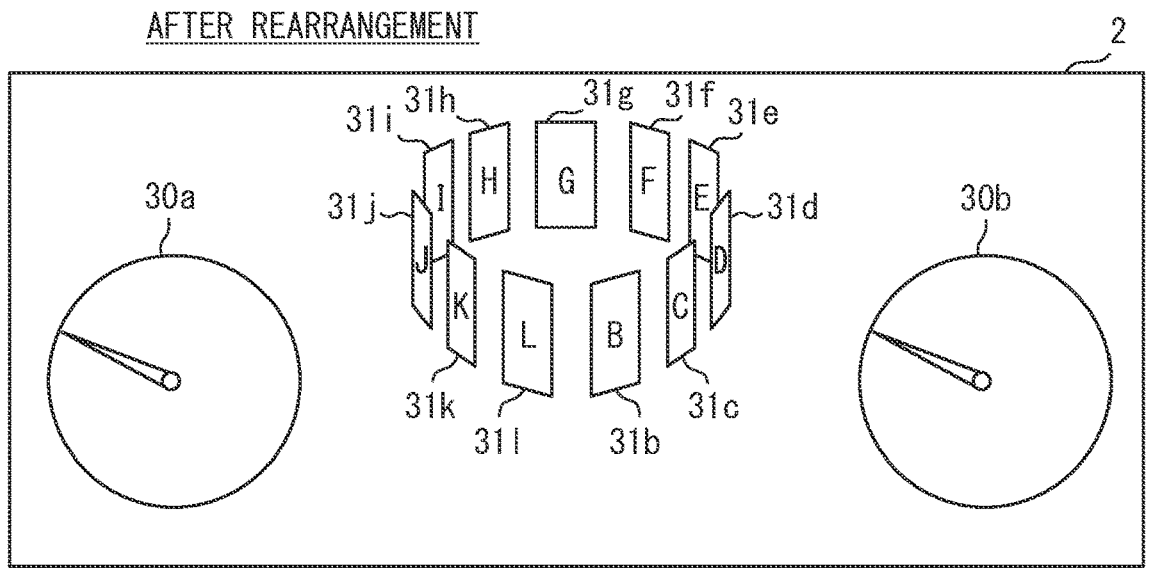
FIG. 6 is a display example on a display device after a display mode is switched.

The following will describe a display example on the display 2 by the display mode determination unit 24. FIG. 4 to FIG. 6 show examples in which the meter images 30a and 30b determined by the meter image determination unit 26 and the icon images 31a to 31l determined by the multimedia image determination units 28 are displayed on the display 2. FIG. 4 is a display example in which the meter image determination unit 26 and all of the multimedia image determination units 28 are in normal states. For example, the meter image 30a is an image of a speedometer, and the meter image 30b is an image of a tachometer. These meter images 30a and 30b are arranged at two ends in a display area of the display 2 in a left-right direction. The icon images 31a to 31l are arranged such that the images are viewed in threedimensional manner in a cylindrical shape at a central portion of the display area of the display 2. The entire icon images 31*a* to 31*b* are configured to rotate so that a front icon image 31 changes according to the user operation.

FIG. 5 shows a state in which an abnormality occurs in the icon image 31*a* and the icon image 31*a* changes to an error image. In the icon image 31*a* shown in FIG. 5, the drawing of image is stopped in the middle. The state monitoring slave 27 determines that the multimedia image determination unit 28*a* is abnormal, and notifies the state monitoring master 25 of the abnormality. When the state monitoring master 25 receives, from the state monitoring slave 27, a notification indicating that the multimedia image determination unit 28*a* is abnormal, the state monitoring master 25 transmits, to the display mode determination unit 24, a notification indicating the abnormality of multimedia image determination unit 28*a*. Upon receiving this notification, the display mode determining unit 24 changes the display mode of the display 2 as shown in FIG. 6 so that a user is less likely feel discomfort caused by the icon image 31*a*, which corresponds to an error image.

In the example shown in FIG. 6, the icon image 31*a* is erased. Then, the positions of the icon images 31*b* to 31*l* are rearranged and changed from the positions shown in FIG. 4 so that the remaining icon images 31*b* to 31*l* are arranged at equal intervals while maintaining the cylindrical arrangement.

Figure 7:
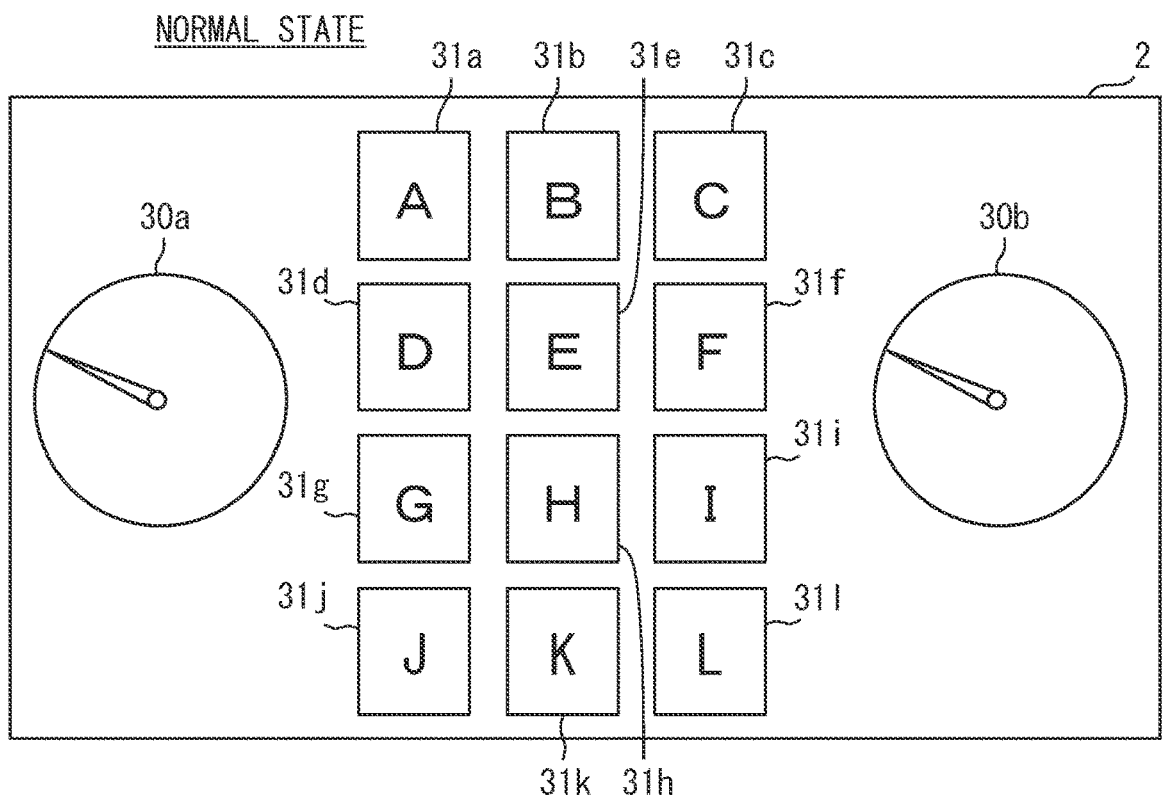
FIG. 7 is a display example on a display device in a normal state which is different from the display example shown in FIG. 4.
Figure 8:
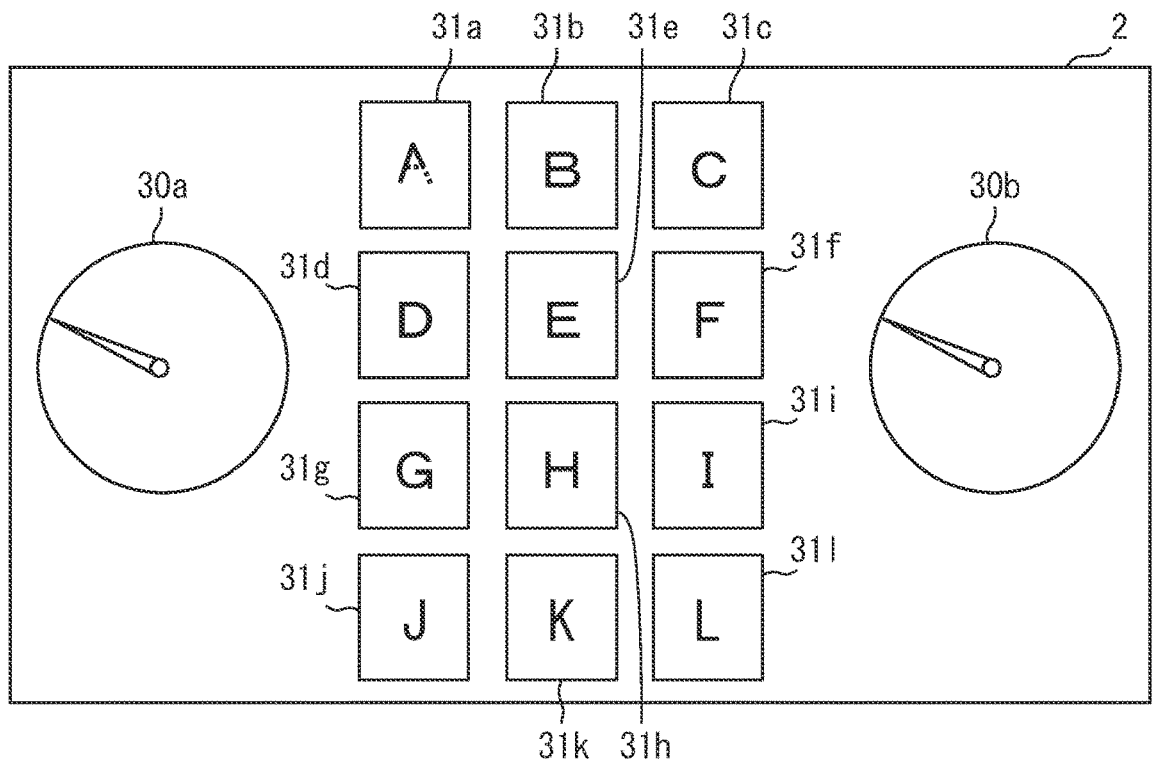
FIG. 8 is a display example on a display device in a case where an icon image is an error image different from the display example shown in FIG. 5.
Figure 9:
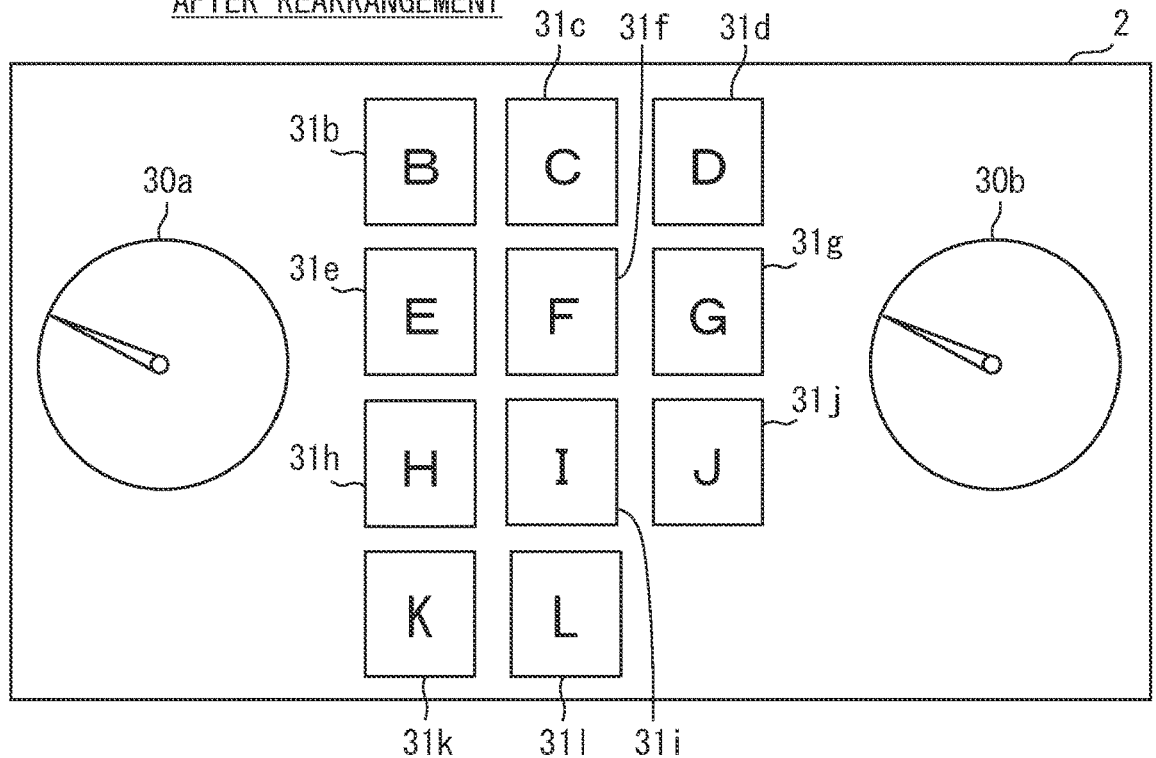
FIG. 9 is a display example on a display device after a display mode is switched.

FIG. 7 to FIG. 9 show display examples different from FIG. 4 to FIG. 6. FIG. 7 is a display example in which the meter image determination unit 26 and all of the multimedia image determination units 28 are in normal states. In FIG. 7, a display mode of the icon images 31*a* to 31*l* is different from FIG. 4.

In FIG. 7, the icon images 31*a* to 31*l* are displayed in a planar shape. The icon images 31*a* to 31*l* are arranged vertically and horizontally in a grid pattern. FIG. 8 shows a state in which an abnormality occurs in the icon image 31*a* and the icon image 31*a* changes to an error image. FIG. 9 is a display example on the display 2 after the display mode determination unit 24 changes the display mode. In the display example shown in FIG. 9, the icon image 31*a* is erased, and the remaining icon images 31*b* to 31*l* are rearranged in a grid pattern at equal intervals in order from the upper left corner.

Figure 10:
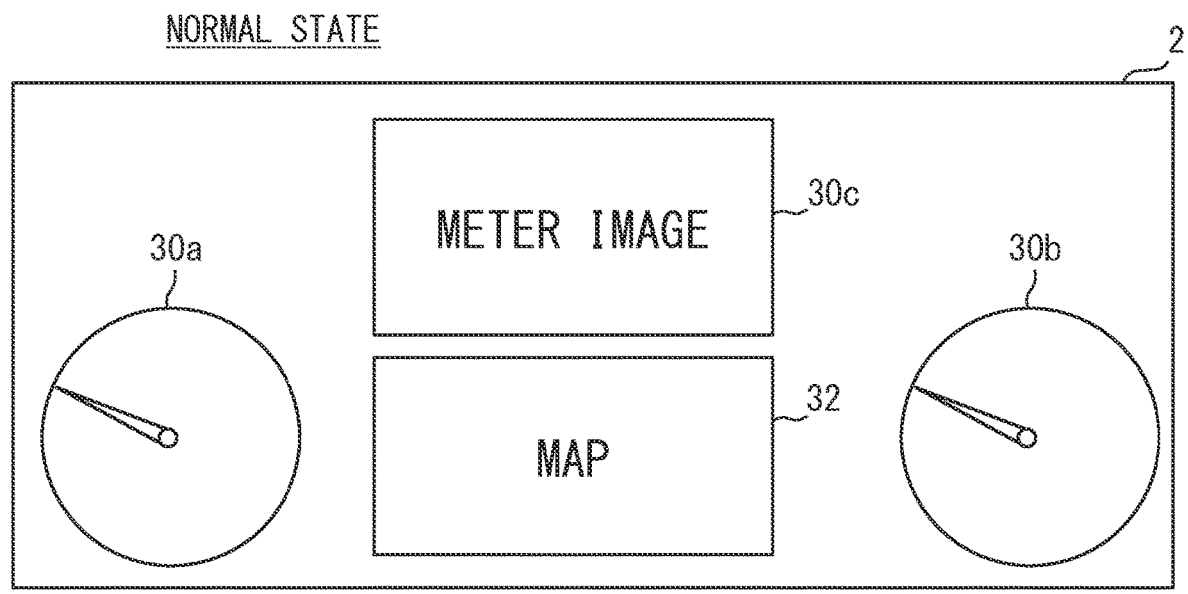
FIG. 10 is a display example on a display device in a normal state which is different from the display examples shown in FIG. 4 and FIG. 7.
Figure 11:
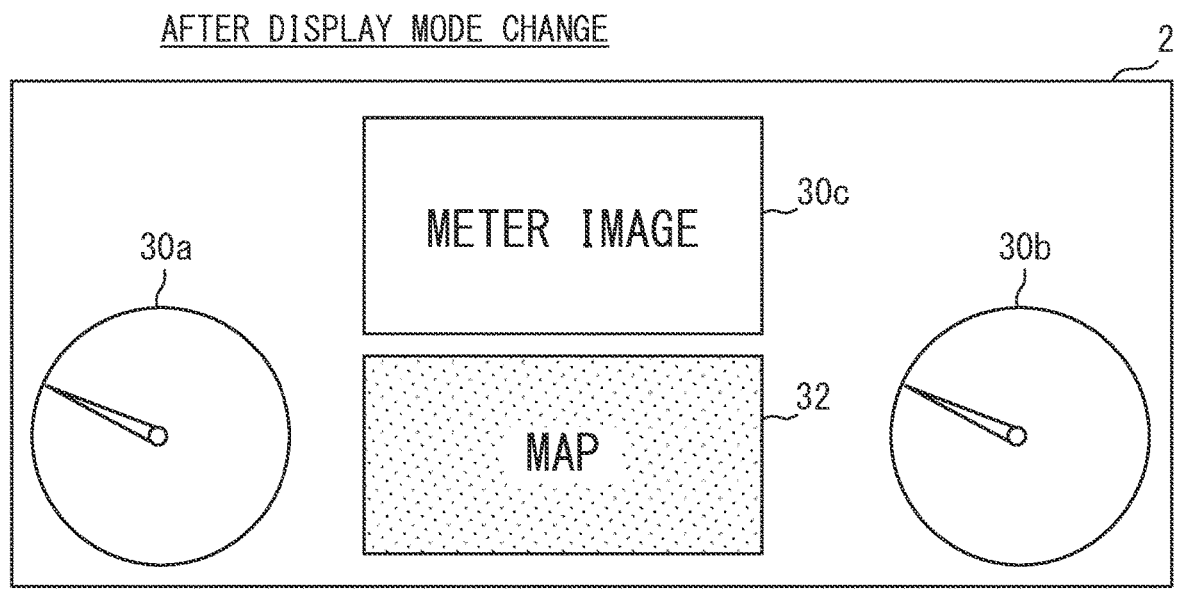
FIG. 11 is a display example on a display device after a display mode is switched, which is different from the display examples shown in FIG. 6 and FIG. 9.
Figure 12:
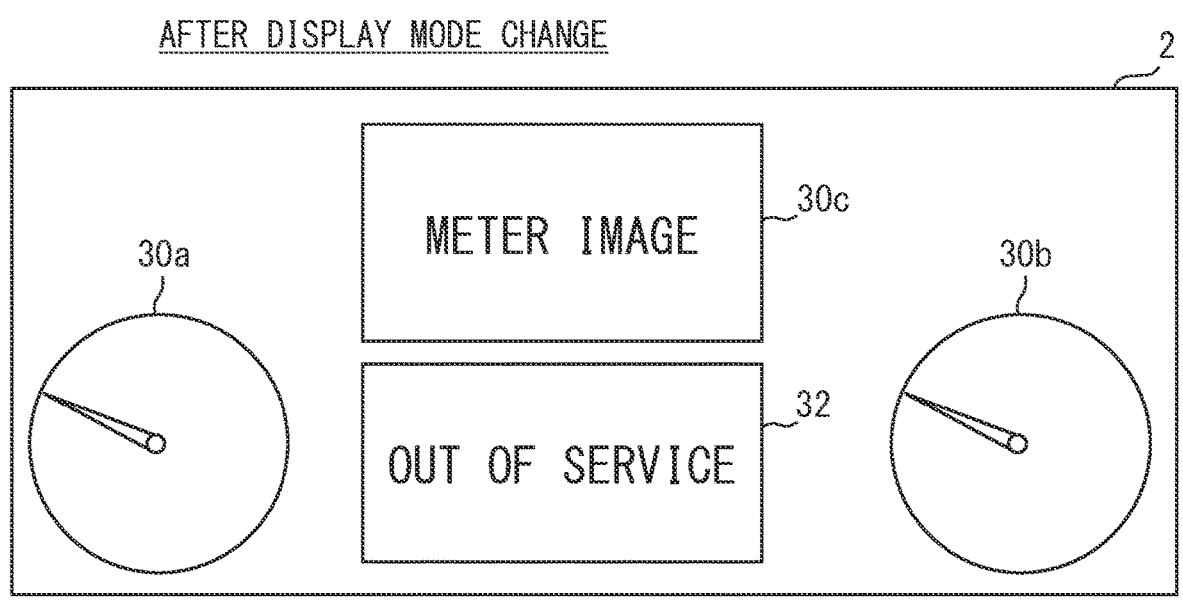
FIG. 12 is a display example on a display device after a display mode is switched, which is different from the display examples shown in FIG. 6, FIG. 9, and FIG. 11.

FIG. 10 to FIG. 12 show display examples different from display examples shown in FIG. 4 to FIG. 9. In FIG. 10, in addition to the meter images 30*a* and 30*b* similar to FIG. 4 to FIG. 9, another meter image 30*c* is displayed at the central portion of the display area of the display 2. The meter image 30*c* is an image drawn by the meter image determination unit 26. The meter image 30*c* shows a traveling state of the vehicle C. For example, the meter image 30*c* shows a shift position or an on/off state of an automatic control. The automatic control may include an automatic brake control.

In FIG. 10, a map image 32 is displayed below the meter image 30*c*. The map image 32 is displayed in response to the icon image 31 corresponding to the route guidance application being selected in the state shown in FIG. 4 or FIG. 7.

FIG. 11 is a display example of the display 2 after the display mode determining unit 24 changes the display mode in response to the map image 32 changing to an error image. In the example shown in FIG. 11, the map image 32 is grayed out. By displaying the map image 32 in gray out manner, the user can be notified of that the route guidance application is currently having an abnormality. Therefore, the user is less likely feel discomfort compared with a case where the abnormal map image 32 in which the current position is not updated or the shape of the road does not indicate the traveling road is continuously displayed.

FIG. 12 shows a display example different from FIG. 11. In the example shown in FIG. 12, a position of the map image 32 is switched by an image showing a message "out of service" which indicating unavailable may be displayed. By displaying this message, the user can be notified of that the display is in an abnormal state. By changing the display mode of the map image 32 in this way, the user is less likely to feel discomfort compared with a case where the map image 32, which is an error image, continues to be displayed with the error.

In the display system 1 of the present embodiment described above, the state monitoring master 25 successively monitors whether the multimedia image determination units 28 are operating normally. When the state monitoring master 25 determines that an error image is displayed on the display 2 due to an abnormality occurred in the corresponding multimedia image determination unit 28, the state monitoring master 25 notifies, to the display mode determination unit 24, of the abnormality occurred in the corresponding multimedia image determination unit 28. In response to the display mode determination unit 24 receiving this notification, the display mode determining unit 24 changes the display mode on the display 2 so that a user is less likely feel discomfort caused by the error image. Therefore, when the image displayed by at least one of the multimedia image determination units 28 changes to an error image, it is possible to make the user feel less discomfort for the error image.

In the present embodiment, the state monitoring master application 15 that monitors the operation of the multimedia application 18 is configured to operate on the high stable real-time OS 12. The multimedia application corresponds to the monitoring target application. Therefore, it is possible to suppress a situation in which the operation of the state monitoring master application 15 becomes abnormal and thereby failing to monitor the operation of multimedia application 18.

In the present embodiment, the display mode determination unit 24 operates on the real-time OS 12. Therefore, even when the operation of the general-purpose OS 13 becomes abnormal, it is possible to change the display mode by the display mode determination unit 24 which operates on the real-time OS 12.

In the present embodiment, the meter application 16 operates on the real-time OS 12. When the meter image 30 is no longer displayed on the display 2 mounted on the vehicle C, the driving operation will be greatly hindered. In the present embodiment, the meter application 16 operates on the real-time OS 12. Therefore, the meter image 30 can be stably displayed on the display 2, and is less likely to be not displayed on the display 2.

The computer 3 includes the hypervisor 11, and the real-time OS 12 and the general-purpose OS 13 operate on the hypervisor 11. Therefore, with a single computer 3, the meter application 16 that requires high stability can operate on the real-time OS 12, and the multimedia applications 18 that require complicated processing can operate on the general-purpose OS 13.

Although the embodiments have been described above, the disclosed technology is not limited to the above-described embodiment, and the following modifications are included in the present disclosure, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

(First Modification)

In the above embodiment, each multimedia image determination unit 28 generates image data for drawing the multimedia image on the display 2. Alternatively, each multimedia image determination unit 28 may only determine the image to be displayed on the display 2, and transmits, to the display mode determination unit 24, the information for identifying the determined image. Then, the display mode determination unit 24 may generate corresponding image data based on the information from the multimedia image determination unit 28.

Similarly, the meter image determination unit 26 may only determine the image to be displayed on the display 2, and the display mode determination unit 24 may generate the image data of the determined meter image to be displayed on the display 2.

(Second Modification)

In the above embodiment, all of the software programs 10 are running on a single computer 3. Alternatively, multiple computers 3 may be provided and the software programs 10 may be distributed to the multiple computers 3. That is, some software programs 10 operating on one computer 3 may be set different from other software programs operating on another computer 3. In this case, one computer 3 may execute the real-time OS 12, and another computer 3 may execute the general-purpose OS 13.

(Third Modification)

In the above embodiment, two OS including the real-time OS 12 and the general-purpose OS 13 are provided in the system. Alternatively, the system may include only one OS and all of the applications may be configured to execute on the same OS.

(Fourth Modification)

In the above embodiment, all of the multimedia applications 18 are set as the monitoring target applications. Alternatively, only a part of the multimedia applications 18 may be set as the monitoring target applications. Further, an application running on the real-time OS 12 such as the meter application 16 may also be set as the monitoring target application.

(Fifth Modification)

In the above embodiment, a display 2 is connected to the computer 3 and multiple images are displayed on the display 2. Alternatively, one or more displays may be connected to the computer 3 in addition to the one display 2. In this configuration, the computer 3 may display images on other displays in addition to the display 2, and the images displayed on other displays may also be set as the monitoring targets.

(Sixth Modification)

The computer 3 and the method thereof which have been described in the present disclosure may be also implemented by a special purpose computer which includes a processor programmed to execute one or more functions implemented by computer programs. Alternatively, the computer 3 and the method described in the present disclosure may be implemented by a dedicated hardware logic circuit. Alternatively, the computer 3 and the method described in the present disclosure may be implemented by one or more dedicated computers configured by a combination of a processor executing a computer program and one or more hardware logic circuits. The hardware logic circuits may be, for example, ASIC or FPGA.

For example, as another display mode, when the icon image 31*a* changes to an error image as shown in FIG. 5, the icon image 31*a* may be grayed out. By displaying the abnormal icon image 31*a* in gray out manner, the user can be notified of that the route guidance application is currently having an abnormality.

The computer 3 corresponds to a display control unit. The real-time OS 12 corresponds to the high stable operating system. The general-purpose OS 13 corresponds to the low stable operating system. The meter image determination unit 26 corresponds to the high stable image determination unit. Each multimedia image determination unit 28 corresponds to the low stable image determination unit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display control device that controls images to be displayed on a single display mounted on a vehicle, the display control device comprising:
   a plurality of image determination units that determine the images to be displayed on the display;
   a state monitoring unit that successively monitors, as monitoring targets, the plurality of image determination units to determine whether an abnormality occurs in the plurality of image determination units;
   a display mode determination unit that switches a display mode of the display in response to the state monitoring unit determining that an error image is displayed on the display due to the abnormality occurred in the plurality of image determination units, the display mode determination unit switching the display mode by erasing the error image and rearranging the remaining images on the display; and
   a computer,
   wherein
   the computer includes:
      a high stable operating system having a relatively high stability;
      a low stable operating system having a stability lower than the stability of the high stable operating system;
      a low stable image determination application that operates on the low stable operating system and controls the computer to operate as a low stable image determination unit, the low stable image determination unit being one of the plurality of image determination units;
      a high stable image determination application that operates on the high stable operating system and controls the computer to operate as a high stable image determination unit, the high stable image determination unit being one of the plurality of image determination units;
      a state monitoring application that operates on the high stable operating system or on the low stable operating system and controls the computer to operate as the state monitoring unit; and a display mode determination application that operates on the high stable operating system or on the low stable operating system and controls the computer to operate as the display mode determination unit, and the state monitoring unit is configured to monitor the low stable image determination unit.

2. The display control device according to claim 1, wherein the display mode determination application operates on the high stable operating system.

3. The display control device according to claim 1, wherein the state monitoring application operates on the high stable operating system.

4. The display control device according to claim 1, further comprising a hypervisor executed by the computer, wherein the high stable operating system and the low stable operating system operate on the hypervisor.

5. The display control device according to claim 1, wherein the high stable operating system determines an image indicating a travelling state of the vehicle as one of the images to be displayed on the display, and the travelling state of the vehicle includes a vehicle speed.

6. The display control device according to claim 1, wherein the low stable operating system determines a map image as one of the images to be displayed on the display.

7. The display control device according to claim 1, wherein the computer further includes a state monitoring slave application that operates on the low stable operating system and controls the computer to operate as a state monitoring slave, and the state monitoring slave monitors an operation of the low stable image determination application and notifies a monitoring result to the state monitoring application.

8. A display control device that controls images to be displayed on a single display mounted on a vehicle, the display control device comprising:

a plurality of image determination units that determine the images to be displayed on the display;

a state monitoring unit that successively monitors, as monitoring targets, the plurality of image determination units to determine whether an abnormality occurs in the plurality of image determination units;

a display mode determination unit that switches a display mode of the display in response to the state monitoring unit determining that an error image is displayed on the display due to the abnormality occurred in the plurality of image determination units, the display mode determination unit switching the display mode by graying out the error image; and a computer, wherein the computer includes:

a high stable operating system having a relatively high stability;

a low stable operating system having a stability lower than the stability of the high stable operating system;

a low stable image determination application that operates on the low stable operating system and controls the computer to operate as a low stable image determination unit, the low stable image determination unit being one of the plurality of image determination units;

a high stable image determination application that operates on the high stable operating system and controls the computer to operate as a high stable image determination unit, the high stable image determination unit being one of the plurality of image determination units;

a state monitoring application that operates on the high stable operating system or on the low stable operating system and controls the computer to operate as the state monitoring unit; and a display mode determination application that operates on the high stable operating system or on the low stable operating system and controls the computer to operate as the display mode determination unit, and the state monitoring unit is configured to monitor the low stable image determination unit.

9. A display control device that controls images to be displayed on a single display mounted on a vehicle, the display control device comprising:

a plurality of image determination units that determine the images to be displayed on the display;

a state monitoring unit that successively monitors, as monitoring targets, the plurality of image determination units to determine whether an abnormality occurs in the plurality of image determination units;

a display mode determination unit that switches a display mode of the display in response to the state monitoring unit determining that an error image is displayed on the display due to the abnormality occurred in the plurality of image determination units, the display mode determination unit switching the display mode by displaying, instead of the error image, a message indicating an occurrence of the abnormality; and a computer, wherein the computer includes:

a high stable operating system having a relatively high stability;

a low stable operating system having a stability lower than the stability of the high stable operating system;

a low stable image determination application that operates on the low stable operating system and controls the computer to operate as a low stable image determination unit, the low stable image determination unit being one of the plurality of image determination units;

a high stable image determination application that operates on the high stable operating system and controls the computer to operate as a high stable image determination unit, the high stable image determination unit being one of the plurality of image determination units;

a state monitoring application that operates on the high stable operating system or on the low stable operating system and controls the computer to operate as the state monitoring unit; and a display mode determination application that operates on the high stable operating system or on the low stable operating system and controls the computer to operate as the display mode determination unit, and the state monitoring unit is configured to monitor the low stable image determination unit.

* * * * *